US008834964B2

(12) United States Patent
Kitada et al.

(10) Patent No.: US 8,834,964 B2
(45) Date of Patent: Sep. 16, 2014

(54) PROCESS FOR FORMING HIGH SURFACE AREA EMBEDDED COATING WITH HIGH ABRASION RESISTANCE

(75) Inventors: Masayoshi Kitada, Saitama (JP); Todd Fitz, Torrance, CA (US); Andrew Tye Hunt, Atlanta, GA (US); Yongdong Jiang, Norcross, GA (US); Jeanne Yadlyne Smalley, Riverdale, GA (US); Marvis White, Atlanta, GA (US)

(73) Assignees: nGIMAT, Co., Atlanta, GA (US); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/765,703

(22) Filed: Apr. 22, 2010

(65) Prior Publication Data

US 2011/0143094 A1    Jun. 16, 2011

Related U.S. Application Data

(60) Provisional application No. 61/285,559, filed on Dec. 11, 2009.

(51) Int. Cl.
| | |
|---|---|
| *B05D 1/12* | (2006.01) |
| *C23C 4/12* | (2006.01) |
| *C23C 24/04* | (2006.01) |
| *B32B 33/00* | (2006.01) |

(52) U.S. Cl.
CPC ........... *B32B 33/00* (2013.01); *B32B 2307/73* (2013.01); *C23C 4/124* (2013.01); *C23C 24/04* (2013.01); *B32B 2307/728* (2013.01); *B32B 2307/554* (2013.01)

USPC ............ 427/190; 427/201; 427/427; 65/60.1

(58) Field of Classification Search
USPC ........................... 427/190, 201, 427; 65/60.1
See application file for complete search history.

(56) References Cited

U.S. PATENT DOCUMENTS

| | | | | |
|---|---|---|---|---|
| 6,852,389 | B2 * | 2/2005 | Nun et al. | 428/143 |
| 6,924,004 | B2 * | 8/2005 | Rao et al. | 427/421.1 |
| 2006/0246297 | A1 * | 11/2006 | Sakoske et al. | 428/426 |
| 2008/0280056 | A1 * | 11/2008 | Maric et al. | 427/446 |
| 2009/0233088 | A1 * | 9/2009 | Lewis et al. | 428/331 |
| 2009/0286008 | A1 * | 11/2009 | O'Neill et al. | 427/554 |

FOREIGN PATENT DOCUMENTS

| | | | |
|---|---|---|---|
| JP | 07-074454 B2 | 8/1995 | |
| WO | WO 2011 / 070789 | 1/2009 | |

* cited by examiner

*Primary Examiner* — Frederick Parker
(74) *Attorney, Agent, or Firm* — William M. Brown

(57) ABSTRACT

The process of the present invention significantly increases the durability of superhydrophobic surfaces, while retaining similar optical properties to those of the original surface. The process uses velocity and heat to take freshly formed nano- and ultrafine particles and can partially embed and chemically bond them to the substrate, creating a strongly bonded nano-to-submicron textured surface. This nanotextured surface can then be modified to have desirable surface properties; for example, it can be hydrophobic, oliophobic, or hydrophilic. The high points of the coating made with this process protect the remainder of the surface from abrasion, thus greatly increasing product life in many uses. In preferred embodiments, the process is used to coat transportation vehicle windshields.

Figure 1:
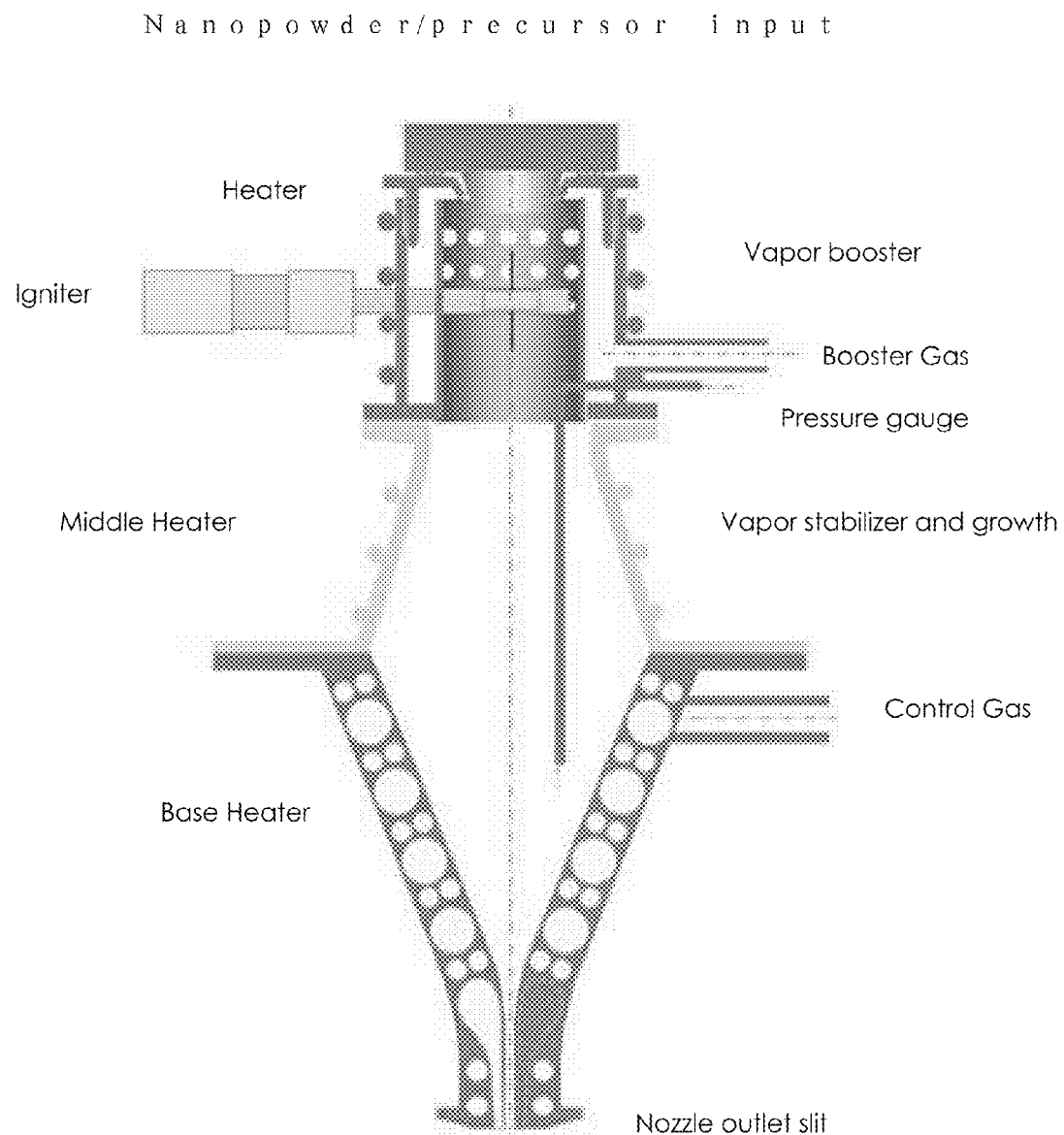
Figure 2:
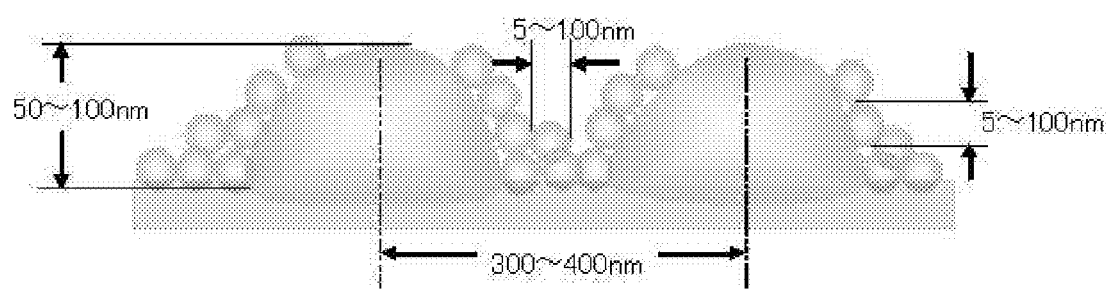

9 Claims, 9 Drawing Sheets

PROCESS FOR FORMING HIGH SURFACE AREA EMBEDDED COATING WITH HIGH ABRASION RESISTANCE

CROSS-REFERENCE TO RELATED APPLICATION

This application claims benefit of U.S. provisional patent application No. 61/285,559, filed Dec. 11, 2009, the entire content of which is incorporated herein by reference.

BACKGROUND TO THE INVENTION

Research and development on self-cleaning coatings on glass, ceramics, plastics, and metals has increased in recent years because the self-cleaning properties of such surfaces can result in large savings in energy consumption. Although superhydrophilic anti-fogging and self-cleaning coatings have been successfully demonstrated with $TiO_2$ thin films, generated by UV illumination, various industrial products require superhydrophobicity (Nakajima et al., Chem. Monthly 132, 31 (2001), Nakajima et al., Adv. Mater. 11, 1365 (1999)) rather than superhydrophilicity. On a superhydrophobic surface, the contact area between solid and water is limited, which limits chemical or mechanical bonding to the surface. Accordingly, various phenomena, such as the adherence of snow, oxidation, and current conduction are expected to be inhibited on such surfaces (Nakajima et al., Chem. Monthly 132, 31 (2001), Nakajima et al., Adv. Mater. 11, 1365 (1999), Yoshimitsu et al., Langmuir 18, 5818 (2002)). On superhydrophobic surfaces, water droplets do not spread out, but bead up, showing very low wettability. The wettability of a solid surface, which is characterized by the contact angle, is a property of the material and depends strongly on both the surface energy and surface geometry. From Nishino's studies, the lowest surface energy yet recorded is about 6.7 $mJ/m^2$, obtained from a surface with regularly aligned closest-hexagonal-packed $CF_3$ groups (Langmuir 15, 4321-4323 (1999)). The corresponding water contact angle was about 120°; this contact angle is not sufficient to form a superhydrophobic surface.

Numerous theoretical and experimental studies have shown that increased surface roughness on hydrophobic surface results in increased hydrophobicity: namely, that it increases the water contact angle on a solid surface. The relationship between surface microstructure, surface roughness, and water repellency (water contact angle and rolling angle) has been investigated by many researchers (e.g., Nakajima et al., Chem. Monthly 132, 31 (2001), Nakajima et al., Adv. Mater. 11, 1365 (1999), Yoshimitsu et al., Langmuir 18, 5818 (2002), Patankar, Langmuir 20, 8209 (2004), Marmur, Langmuir 20, 3517 (2004), Patankar, Langmuir 20, 7097 (2004), Duparre et al., Appl. Optics 41, 3294 (2002), Bico et al., Europhys. Lett. 47, 220 (1999), Chen, et al., Langmuir, 15, 3395 (1999), Miwa et al., Langmuir 16, 5754 (2000), Oner & McCarthy, Langmuir 16, 7777 (2000), Patankar, Langmuir 19, 1249 (2003), He et al., Langmuir 19, 4999 (2003), Lafuma & Quere, Nat. Mater. 2, 457 (2003), Quere et al., Nanotechnology 14, 1109 (2003), Nashino et al., Langmuir 15, 4321 (1999), Wenzel, J. Phys. Chem. 53, 1466 (1949), Cassie, Discuss. Faraday Soc. 3, 11 (1948), He et al., Colloids and Surfaces A: Physicochem. Eng. Aspects 248, 101 (2004), Roura & Fort, Langmuir 18, 566 (2002), Furmidge, J. Colloid Sci. 17, 309 (1962), Johnson Jr. & Dettre, Adv. Chem. Ser. 43, 112 (1963), Barthlott & Neinhuis, Planta 202, 1 (1997), Feng et al., Adv. Mater. 14, 1857 (2002), Otten & Herminghaus, Langmuir 20, 2405 (2004)). To describe the wetting behavior on a rough surface, Wenzel (Nakajima et al., Chem. Monthly 132, 31 (2001), Wenzel, J. Phys. Chem. 53, 1466 (1949)) proposed a model to calculate apparent water contact angle, $\theta_r^w$, on such a surface, on which water droplets wet the grooves:

$$\cos\theta_r^w = \frac{r(\gamma_{sv} - \gamma_{sl})}{\gamma_{lv}} = \cos\theta_e$$

where r is a roughness factor, defined as the ratio of actual area of a rough surface to the geometric projected area. Because r is always larger than unity, surface roughness enhances both the hydrophilicity of hydrophilic surfaces and the hydrophobicity of hydrophobic surfaces in the Wenzel regime. In this case, hydrophobicity of the rough surface is amplified by the increase in solid-liquid contact area (Yoshimitsu et al., Langmuir 18, 5818 (2002)).

In the case of water droplets sitting on the peaks of a rough surface, in which a composite interface consisting of both solid and air is formed between the water droplet and the rough surface, Cassie (Nakajima et al., Chem. Monthly 132, 31 (2001), Cassie, Discuss. Faraday Soc. 3, 11 (1948)) proposed an equation describing the apparent contact angle, $\theta_r^c$, assuming a water contact angle of 180° for air:

$$\cos\theta_r^c = f\cos\theta_e + f - 1$$

where f is defined as the area fraction of the solid-liquid interface. In the Cassie regime, hydrophobicity of the rough surface is amplified by the decrease in solid-liquid contact area (Yoshimitsu et al., Langmuir 18, 5818 (2002)).

To obtain superhydrophobic surfaces, coating with low-surface-energy materials is often necessary, especially for inorganic materials. Regarding chemical methods to lower surface energy, fluorine is the most effective element, because it has a small atomic radius and the highest electronegativity among all atoms, so it forms a stable covalent bond with carbon, resulting in a surface with low surface energy. It has been reported that surface energy increases when fluorine is replaced by other elements, such as H and C, in the order —$CF_3$<—$CF_2H$<—$CF_2$—<—$CH_3$<—$CH_2$—. The closest hexagonal packing of —$CF_3$ groups on the surface would give the lowest surface energy of the materials (Shang et al., Thin Solid Film 472, 37 (2005)). A coating filled with inorganic/organic particles yielded water advancing and receding contact angles of 140° and 130°, respectively.

As addressed by Gould, a so-called "Lotus Spray" process was developed by BASF to produce thin films mimicking lotus leaf morphology, in which a mixture of silica or alumina nanoparticles, hydrophobic polymer, and propellant gas was used to directly deposit self-cleaning thin films. Prototype products were demonstrated using this technique. Other techniques to fabricate water-repelling polymer-based superhydrophobic surfaces include microreplication of UV-curable materials against a nickel master structure (Lafuma & Quere, Nat. Mater. 2, 457 (2003), Quere, et al., Nanotechnology 14, 1109 (2003)), solidification of dimers (Onda et al., Langmuir 12, 2125 (1996)), and composite-plating substrates with oligomers (Kunugi et al., Electroanal. Chem. 353, 209 (1993)).

Based on the cited results, superhydrophobic surfaces have been successfully fabricated by various techniques; however, many of these polymer coatings are only about 50% as hydrophobic as a lotus leaf surface. Also, most of the coatings lose their shine and transparency. Such low transparency is not suitable for many applications, including the large window, automobile, and solar cell markets. Most importantly, these polymer coatings show poor adhesion to the substrate and can easily be rubbed off.

Chemical vapor deposition (CVD) is another common technique employed to prepare nano-textured superhydrophobic self-cleaning surfaces (Hozumi & Takai, Thin Solid Films 303, 222 (1997), Wu et al., Surface and Coatings Tech. 174-175, 867 (2003), Shang et al., Thin Solid Film 472, 37 (2005), Wu et al., Chem. Vap. Deposition 8, 47 (2002)). In one of Wu's studies, silica-based water-repelling thin films were deposited onto glass and polymethylmethacrylate (PMMA) substrates, by microwave plasma-enhanced CVD (MW-PECVD) using trimethylmethoxysilane (TMMOS) as a raw material Wu et al., Chem. Vap. Deposition 8, 47 (2002). A water contact angle of about 150° was obtained. Alumina-based hydrophobic surfaces with various surface roughnesses were also prepared using a sublimating material, aluminum acetylacetonate (AACA; Nakajima et al., Adv. Mater. 11, 1365 (1999), Miwa et al., Langmuir 16, 5754 (2000), Nakajima et al., Langmuir 16, 7044 (2000)). In this method, a commercial boehmite powder (AlOOH) and reagent-grade AACA were mixed with ethanol. The weight ratio of AACA to ethanol was fixed at 0.0366, and boehmite to ethanol was varied, from 0.0008 to 0.0096, to control the roughness. After dissolving AACA in ethanol, the suspensions were deposited onto Pyrex glass plates by spin-coating. The coated glass substrates were then calcined at 500° C. for 20 min. The boehmite films were roughened by the sublimation of AACA during calcinations. The surface energy of the alumina thin films was chemically modified by coating with heptadecafluorodecyltrimethoxysilane, evaporated at 250°. The highest water contact angle achieved in their study was about 161°, with a rolling angle of a 7 mL water droplet of about 1°, which was obtained on the film with a boehmite:ethanol ratio of 0.0016:0.0024. These processes result in a layer on top of the existing substrate, with no embedding.

A phase separation method of tetraethyl orthosilicate induced by the addition of an acrylic polymer was also reported, to prepare bubble-like silica thin film, which was subsequently coated with fluorinated silane to form superhydrophobic surfaces (Nakajima et al., Thin Solid Films 376, 140 (2000)). It was claimed that the hardness of the thin films was almost at the same level as normal silica-based hard thin films. However, the highest water contact angle achieved was only about 150°, with a rolling angle of higher than 10°. Under these conditions, the transmittance at 500 nm was lower than 90%. Additionally, silica microstructures have been created by molding a sol-gel of tetramethyl orthosilicate (TMOS) between bare Si water and an elastomeric mold, designed by replicating a pattern in photoresist. On a spike-like structure prepared by this molding technique, an advancing contact angle of 170° and a receding contact angle of 155° were obtained, showing a contact angle hysteresis of about 15°.

Water-repelling surfaces made of anodically oxidized Al surfaces treated with fluorinated silane were also reported by Shibuichi et al. (J. Colloid & Interface Sci. 208, 287 (1998)) A water contact angle of about 160° was achieved on those surfaces. In addition to the common materials of silica and alumina, zirconia (Duparre et al., Appl. Optics 41, 3294 (2002)), zinc oxide (Li et al., J. Phys. Chem. B 107, 9954 (2003)), polymer nano-fibers (Feng et al., Adv. Mater. 14, 1857 (2002)), and aligned carbon nano-tubes (Feng et al., Adv. Mater. 14, 1857 (2002)) have been investigated for superhydrophobic applications.

In summary, hydrophobic properties are well-known to be enhanced by increased surface roughness on hydrophobic surfaces; thus, superhydrophobic surfaces are commonly prepared through a combination of surface roughening and lowering of the surface energy. With respect to surface roughness, hydrophobicity and transparency are competitive properties. When the roughness increases, the hydrophobicity increases, whereas the transparency decreases. Thus, precise control of the roughness (or feature size) is required to satisfy both properties.

Because visible light is in the wavelength range of ~400 to ~700 nm, the feature size on a transparent superhydrophobic surface should preferably be smaller than this. Although the preparation of superhydrophobic surfaces has been extensively studied, only a few methods and materials have been reported to date for transparent films (e.g., silica thin films by sol-gel (Shang et al., Thin Solid Film 472, 37 (2005)) and MWPECVD (Wu et al., Chem. Vap. Deposition 8, 47 (2002)) techniques, and alumina thin films by sol-gel (Tadanaga et al., Am. Ceram. Soc. 80, 1040 (1997), Tadanaga et al., J. Am. Ceram. Soc. 80, 3213 (1997)) and sublimation (Miwa et al., Langmuir 16, 5754 (2000)) techniques). However, these surfaces suffer from either low contact angles and/or high rolling angles (Shang et al., Thin Solid Film 472, 37 (2005), Wu et al., Chem. Vap. Deposition 8, 47 (2002)) or high reflectivity, caused by the refractive index mismatch between the thin films and substrates (Miwa et al., Langmuir 16, 5754 (2000), Tadanaga et al., Am. Ceram. Soc. 80, 1040 (1997), Tadanaga et al., J. Am. Ceram. Soc. 80, 3213 (1997)). Thus, there is a continuing need to produce improved films and to add strength to them.

As previously mentioned, CVD techniques are among those commonly used for producing superhydrophobic thin films. Although these techniques and systems have been improved significantly in recent years, there are still some intrinsic shortcomings associated with conventional CVD, including batch processing and the high cost of the necessary vacuum chamber.

To achieve reasonable transport and deposition rates, CVD precursors must also have high vapor pressures; these reagents are generally expensive, typically unstable, and often toxic. In all cases, the substrate must be heated to the reaction temperature (typically ~300 to ~900° C.), severely limiting the choice of substrates. CVD deposition of multi-component compounds requires a complex orchestration of vaporization, transport, reaction, oxidation, and byproduct evolution for multiple reagents.

Thus, it is difficult and expensive to use conventional CVD for complex thin films. The sol-gel process has some advantages over other traditional techniques, such as the ability to coat moderately large substrates and no need for a vacuum chamber. However, it suffers from disadvantages too, including expensive precursors, a multi-step process, a long process time, no embedding, and the need for a high temperature post-deposition heat treatment, which may cause cracks in thin films, due to shrinkage.

Embodiments of the present invention overcome the shortcomings of the traditional deposition techniques, while yielding equal and/or better quality thin films at a much lower cost, addressed in detail below. The innovative features of the present invention enable the development of superhydrophobic self-cleaning surfaces that more closely mimic lotus leaf morphology and performance, while also exhibiting high optical and mechanical properties. Such results are possible because embodiments of the present invention provide the ability to deposit thin films with dual nanostructured surfaces continuously and in a single step, and provide for some degree of embedding to provide optimal strength and abrasion resistance. The thin film morphology and composition can be manipulated by controlling the vapor deposition and/or nanoparticle synthesis parameters. The novel processes of the present invention also provide flexibility in the selection of thin film and particulate material composition, through modification of liquid feed solution chemistry.

In a published patent application, by Rajala (US 2009/0095021 A1), nanopowders were made and were then melted onto the surface of glass at its softening temperature. However, Rajala lacks any instruction about velocity and cites the use of normal air pressure. The present invention uses pressure to enhance velocity to enable embedding of the material into the surface of the substrate, which is important in providing optimal mechanical properties and durability.

Traditional thermal spray processes involve granular powder material being fed into a high heat source so that it is melted and splattered onto the surface. This process has been limited to material above the agglomeration size of about 0.5 µm, and uses high amounts of energy and gasses to achieve high temperatures (up to about 10,000° C.) and velocity (even faster than the speed of sound). The high velocity aids in adhesion to the substrate. These coatings are always non-transparent, because of the large-sized material or the resulting structures. When smaller sized powder, such as <~400 nm, is fed into the thermal spray devices, they are either too difficult to separate, due to strong powder bonding, or they are vaporized or melted in the very high temperature environment of thermal spray equipment. These traditional thermal spray processes have not yielded desirable nano-sized structures with high interfacial properties, and cannot produce optically clear coatings.

DESCRIPTION OF THE INVENTION

The present invention provides a process for forming an abrasion-resistant coating and thereon growing high surface area nanostructures, which can be chemically treated, yielding hydrophobic, oleophobic, hydrophilic, or other desirable surface properties. Preferably, the coated surface only nominally alters the light characteristics of the substrate, so that clear substrates remain clear and colored substrates retain a similar color. This requires that the surface features be smaller than the wavelength of visible light (i.e., <~400 nm). To ensure high adhesion and abrasion-resistance, the coating material should deform the substrate surface and preferably become partially embedded into the substrate surface.

The very small size of the 'nano' features that enhance surface effects are preferably below about 60 nm and more preferably below about 30 nm and can have branching structures. However, these small 'nano' features are not very strong and are readily worn away. To protect them, it is preferable to have larger or 'ultra-fine' strong features that are dense and well-bonded to the substrate that do not wear readily. These 'strong' structures should be in the ~100 to ~400 nm size range, and should be separated sufficiently to allow surface interaction of the nanostructures with liquids, but close enough to protect the nanostructures from abrasion by solids contacting the surface.

Embodiments of the present invention use a nano-valley-concept (NVC), as described, with larger, or ultrafine stronger features protecting the smaller features. This is done by partially embedding the larger (~100 to ~400 nm) features, first by deforming the substrate surface with a high injection velocity and with a partially melted interface between said features and the substrate, forming larger projections and valleys, and depositing the small nanostructures in the valleys. Additionally, in another embodiment, the two sized structures can be grown at the same time, by feeding a mixture of nano and ultrafine powders together.

The 'wide range injection nozzle' (WRIN) of the present invention is a device that takes gas-entrained nano or ultrafine powders in one end that is wide-mouthed and controls the temperature, while increasing the velocity of the carrier gas flow at the smaller opening end of the WRIN. The WRIN has heaters to regulate its body temperature and that of the acceleration carrier gas(ses). WRIN gasses are supplied so that inside the chamber of the WRIN, it is positively pressured with regard to ambient. Additional pressurized gasses are used to create Venturi effects that accelerate the powder-containing carrier gas(ses) through the smaller opening end of the WRIN. Heating of the gas(ses), which then expand, also increases the velocity, due to the increased volume. In an embodiment, the entire combustion chemical vapor condensation (CCVC) or other method for making nanoparticles end is preferably enclosed in the WRIN, in which case this can be at high pressure to further enhance the velocity of the carrier gas(ses).

The CCVC process or other known methods can be used to make a wide range of nano and ultrafine powders. CCVC is the preferred method of making powders in the present invention. The CCVC process, also referred to as a flame spray or flame pyrolysis process, is existing technology and one of skill in the art can make nanopowders or ultrafine powders using this process. As an example, one proprietary CCVC method uses nGimat Co.'s Nanomiser® device. Once made, these powders do not adhere strongly to a surface unless bonded by some means. The WRIN device is effective at bonding such powders to surfaces.

In another embodiment of the present invention, two different sizes of powders are formed in the WRIN chamber and then they are deposited onto the surface at one time or in two separate WRINs, with the large particles being deposited first. Two or more flames can be used to feed the main chamber of the WRIN. The concentration of the precursor and degree of atomization can be controlled so that the size of the powders is different. These are then mixed in the WRIN chamber to enable a bimodal size distribution of the material being deposited. The large material will have greater momentum and enable some degree of embedding in the substrate surface, at a preferred velocity.

The WRIN device can also grow nanometer-to-submicron-sized powders by controlling the processing conditions, such as the temperature, pressure, carrier gas flow rate, and time. Nanometer-sized or ultrafine material is known to have reduced melting points. Controlling the temperature, pressure, and carrier gas flow inside the WRIN allows for the nanopowders to collide and grow into larger sized powders, with the growth of particle size limited, in part, by the effective melting point of the material, carrier gas flow rate, and the temperature. This growth is also be limited by the number density of the particles in the gas stream and time for collisions. A range of material sizes is effectively produced, as many nanopowders come through without collision, and others with varying degrees of collision, but an upper size limit can be controlled so that NVC features do not grow so large that undesirable light effects occur. The shape of the WRIN, with its narrowing at the gap, entices vapor and particle interactions to enhance growth to form the >150 nm-sized material needed for the strong structures.

The key to the present invention is to immediately take the freshly formed nano and ultrafine powders, while still in their original gas flow, and to use them to deposit strongly bonded, abrasion-resistant coatings with controlled microstructures. The present inventions uses freshly made ultrafine and nanopowders of a desired size, still in the original gas flow, and bonds them to the substrate, through the use of heat and velocity. The freshly prepared powders are directly fed into the thermally- and velocity-controlled WRIN, providing a desirable level of bonding. Higher velocities can reduce the required temperature to achieve bonding and embedding in the surface of the substrate. A wide range of substrate materials can be coated including glasses, polymers, ceramics, metals, and composites.

In almost all cases, the longer the bond length, the stronger the overall bonding between the two materials. Embedding increases the bond length. Additionally, dense and wide structures are generally more abrasion-resistant than porous or narrow structures. To provide space for the nanostructures, however, the strong features should not be too flattened. It is preferable that the strong features have a shape resembling a semicircle; such strong features are resistant to breaking easily under a wide range of impinging force directions or incident angles.

To ensure the best bonding, some substrates can be heated prior to coating. This can help form a wide base to the strong structures with a rounded top and are at least partially embedded in the substrate surface, so that they are abrasion-resistant. In embodiments of the present invention, the substrate can be heated separately, prior to coating, or directly by the CCVC/WRIN process. If the substrate is heated to near its softening point, then the heated CCVC powders can partially embed into the substrate, by deforming the substrate to some degree. The substrate can also be heated to near the point of the freshly made powders' softening point to make the impacting particle more likely to deform onto the substrate, yielding a wide base of bonding. The WRIN can, in many cases, provide the right environment without supplemental substrate heating. With the right temperature and velocity control it is possible to create an interface that has a composition mixed between the substrate and the powder compositions. This composition-mixed layer between the powder and the substrate creates one of the highest bond strengths when combined with partial embedding.

The combustion process can create a higher temperature than is desirable for the processing. So that the WRIN device can properly control the injection temperature, it may be preferable to reduce the temperature of these gasses and then let the temperature be increased again by the WRIN device heat controllers. Thus, the gasses can be cooled below that of the temperature of the heated walls, so that the temperature of the exiting gasses and material is controlled by the heated walls. To accomplish this, there can be a short distance between the flame and the WRIN, or a boost gas can be mixed in after the flame to partially cool the gasses, so that their temperature is below that of the WRIN exit temperature. In some cases, the boost gas might be at too high a flow rate or too cool, causing the chamber temperature to become reduced to too low a value, so that the WRIN walls could not heat them back up readily to desirable processing conditions. In such a case, the boost gas supplied into the main chamber can be preheated to a desirable level for easy processing and control in the WRIN. It is preferred to have the gasses in the WRIN device reach a low temperature of ~100° C. or closer to that of the WRIN wall temperature.

To further control the temperature of the particle interaction with the substrate, radiation heaters can be attached to one or both sides of the WRIN device. Such radiation heaters would keep the exiting gas at the desired temperature near the substrate surface for an extended period of time. When positioned on the side of the incoming uncoated substrate, this gas flow and heater(s) can also provide control of the substrate temperature coming into the primary gas jet for better deformation/embedding into the substrate surface. The heater on the coated or exit side can provide for annealing and stronger bonding.

The CCVC particulates are grown to the size needed for strong structures. This is done by adjusting the solution concentration and atomization, so that desired sizes are achieved. Because they are freshly made, the powders are mostly not agglomerated and can individually travel through the WRIN and strike the substrate surface. The density and spacing of the strong features are controlled by determining the number of particles emitted by the WRIN and the moving speed of the WRIN and/or the substrate. If, for example, the WRIN is ejecting 1,000,000,000 particles per mm per min and is moving at 1 m/min, then there will be about 1,000,000 strong features per mm$^2$. This is about one strong feature per square micrometer. Alternatively, if there is about 100,000,000 to about 100,000,000,000 powder particles ejected per min per mm length of the outlet gap with a traverse speed across the surface being coated of about 1 to about 100 m/minute, one can calculate the amount of powders needed for different traverse speeds and widths. If the strong feature has a resulting base of 300 nm, then over 90% of the surface is still free for nanostructures.

In embodiments of the present invention, the input into the WRIN can be a single nanopowder-producing system, such as a CCVC system, or multiple units. As the width of the material to be coated is increased, then WRIN needs to be wider to coat in a single pass. Because the WRIN is a linear system, it can be readily scaled to any line width in a preferred embodiment of the present invention. To have the freshest nanopowders, more CCVC units can be placed along the length. It can also be an advantage to have the flames of the CCVC intersect. This coupling of CCVC flames can help ensure that all vapor material is coalesced into powder and that any nanopowders grow into the desired size range. Larger powders are also more positively affected by velocity, adding in surface bonding, as they have higher inertia. Kinetic energy is a product of mass and velocity, with high kinetic energy providing energy that can add in bonding along with the thermal conditions.

The particle can deform into the substrate or the substrate can deform the particle or both particle and substrate can partially deform. This will depend on the relative strength of each material, in which one factor is how close to its melting point either is. In some cases, both can deform when close enough in properties or the velocity is high enough. Any of these cases can provide for strong bonding, as long as there is a sufficient interface between the particle and substrate. It is also possible to model these interactions prior to experimentation when using known materials.

It can be an advantage for the particle material to have a hardness higher than that of the substrate. One example is silica on polycarbonate, and another is borosilicate on soda-lime glass. This can yield not only an abrasion-resistant surface, but one that is stronger than the original material. In the first example, the silica will most likely deform the polycarbonate with a long length of bonding, relative to the particle size. At a minimum, the length of bonding should be the radius or longer of the original particle, but more preferably the bonding length is the same as the diameter. In many cases, metals are softer than oxides, and the substrate is more deformed than the particle. However, if the metal is relatively cooler and the oxide very hot, then the oxide may deform more than the metal.

The materials entering into the CCVC and WRIN are at pressure, cooler, and some are compounds with larger molecular weight than those exiting. The reacting species normally produce heat and result in more moles of reactants due to smaller molecules being formed. V=nRT/P and in the present invention, n and T are increased and P is decreased, all of which increase volume, which correspondingly increases the velocity of the exiting gasses. Enhancing this velocity is the boost gas, which is preferably air, which is heated in the WRIN structure prior to injection into the CCVC-formed gas. This boost gas is directed towards the WRIN exit to add directional component to the flow and to entrain/accelerate CCVC gasses by the Venturi effect. If the CCVC WRIN system is enclosed, then even higher velocity can be achieved as the pressure inside the device is increased.

Figure 3A:
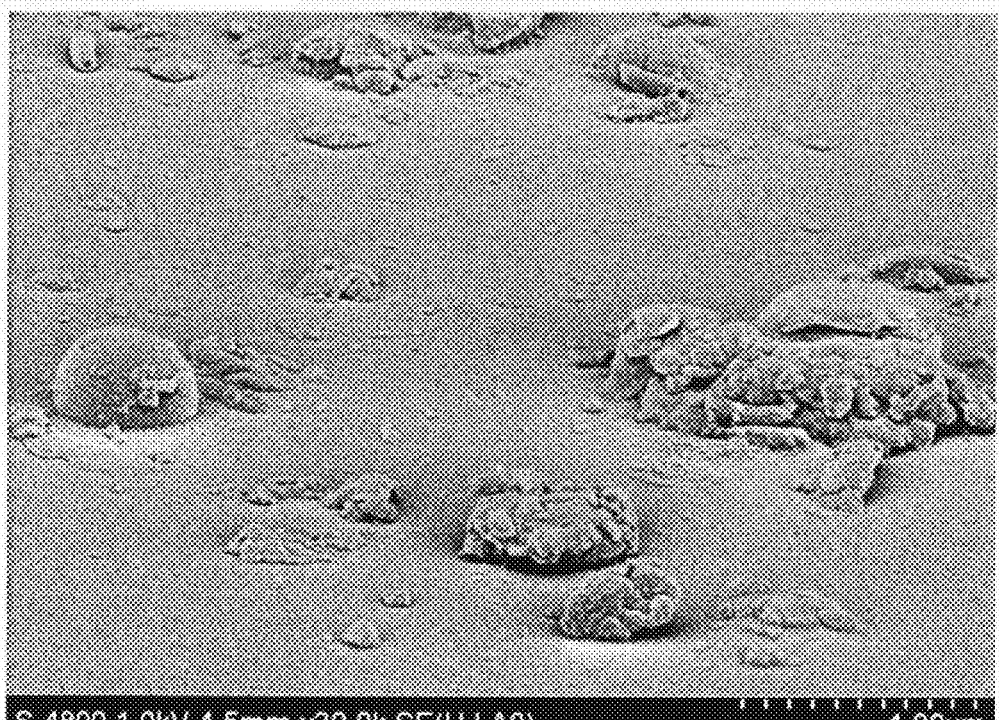
Figure 3B:
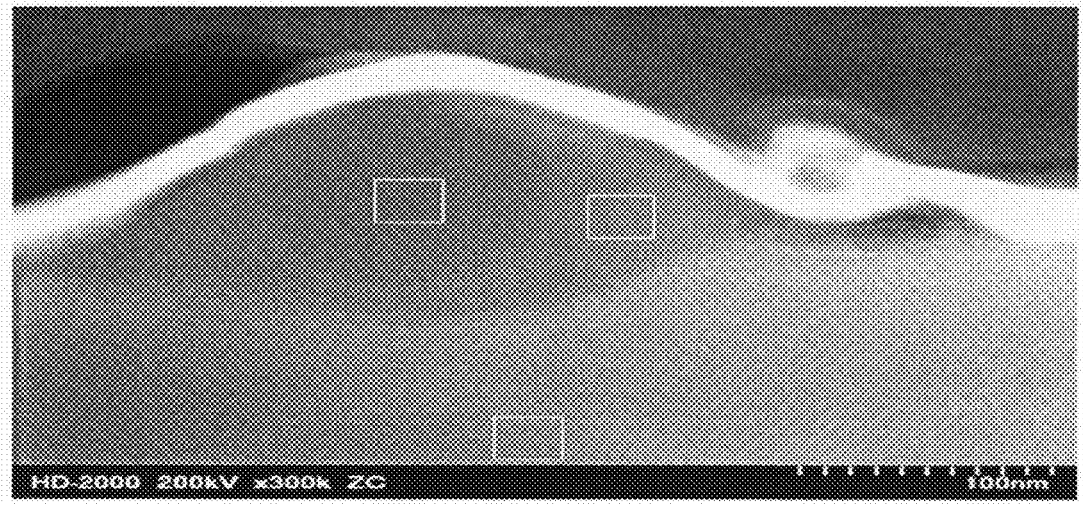
Figure 3C:
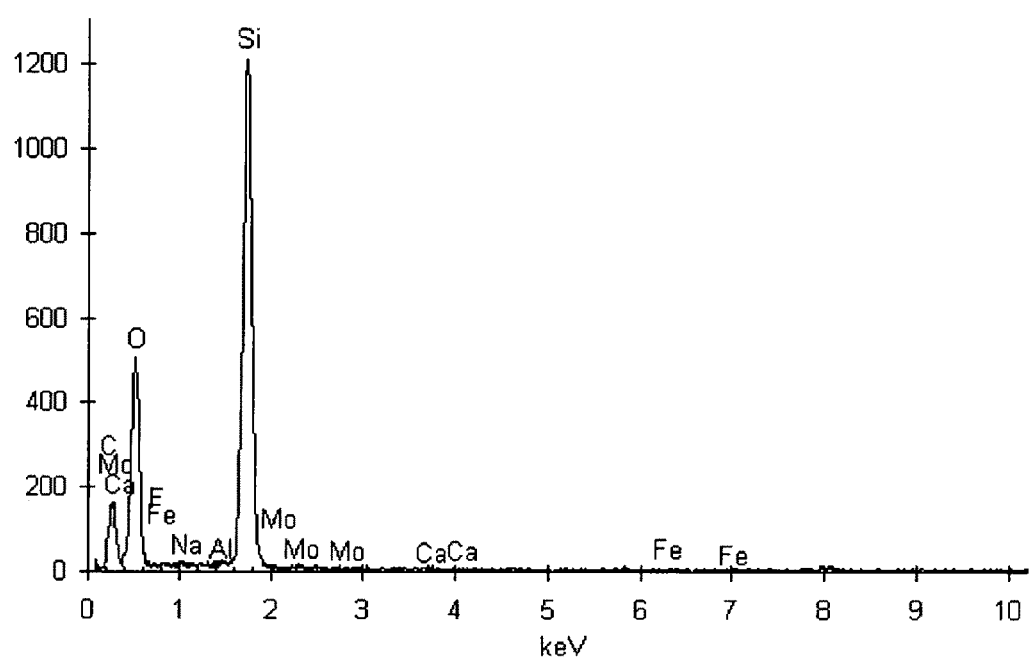
Figure 3D:
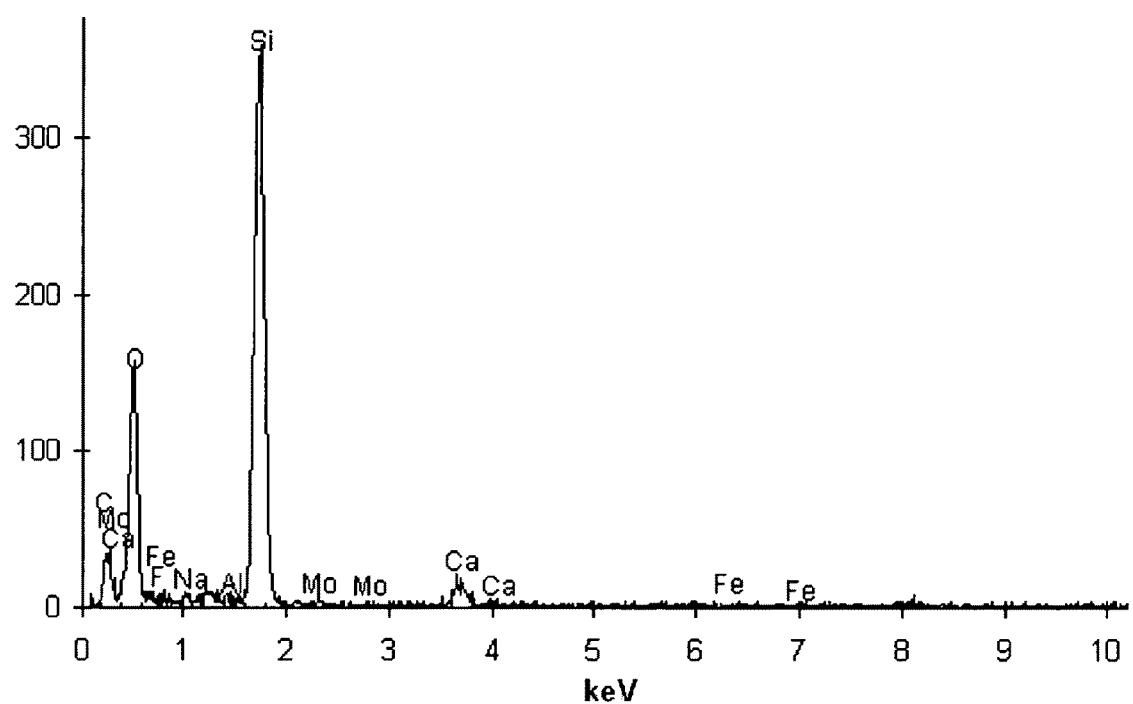
Figure 3E:
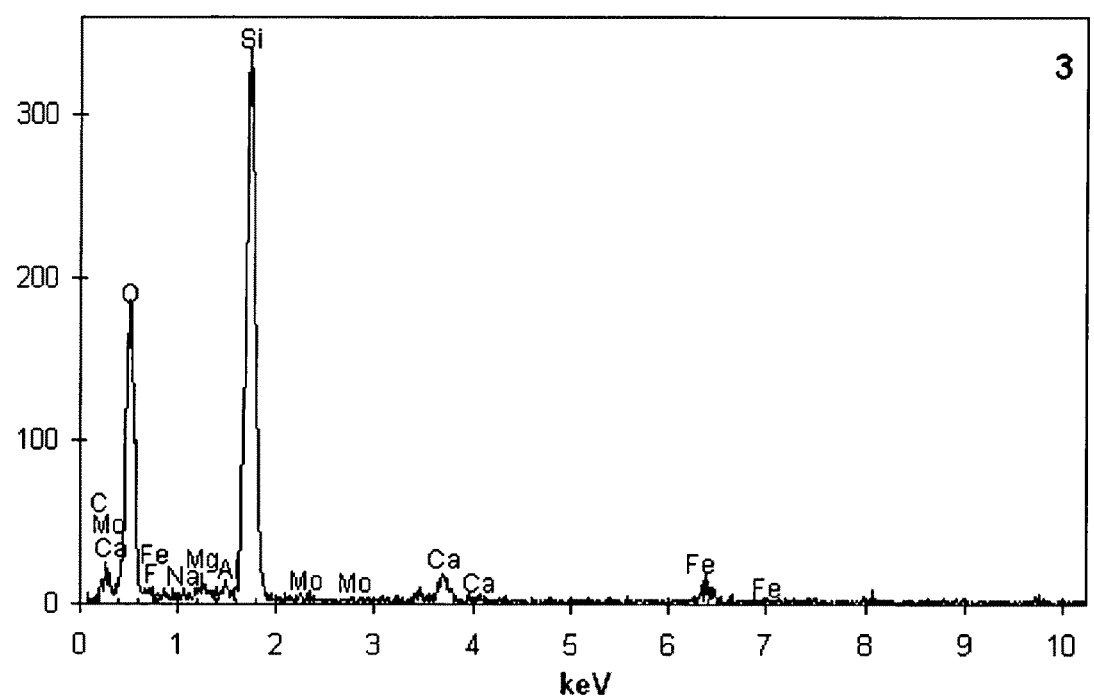
Figure 4:
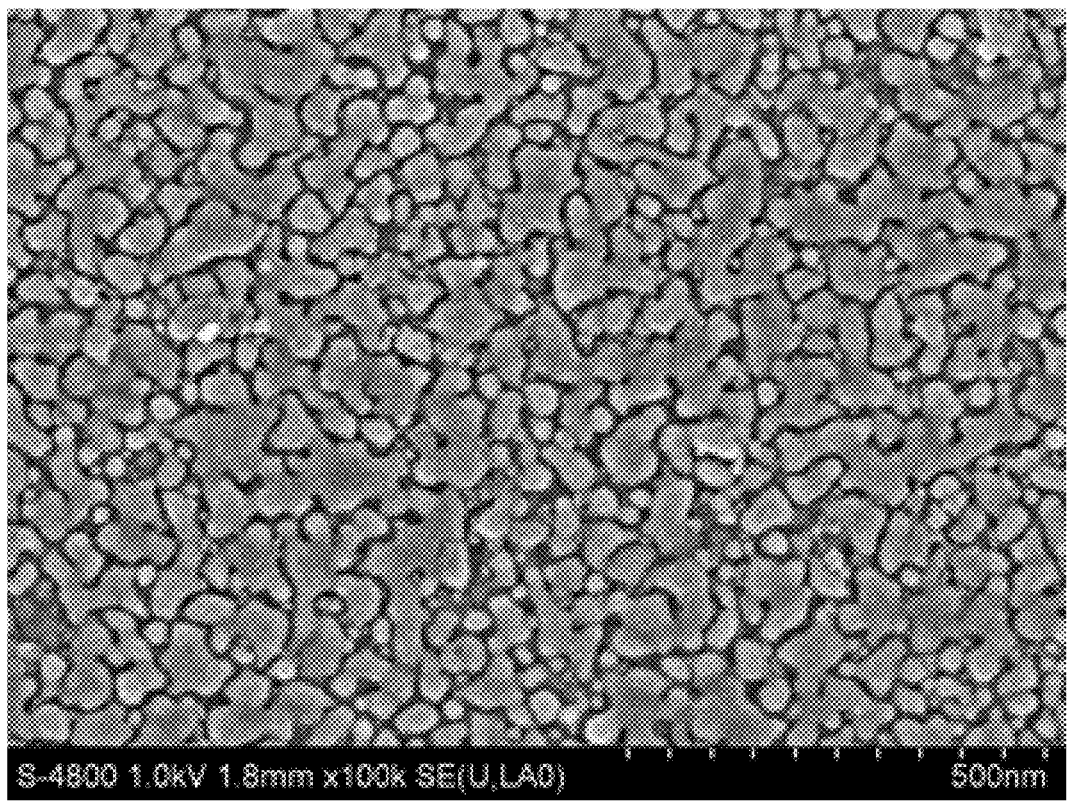
Figure 5:
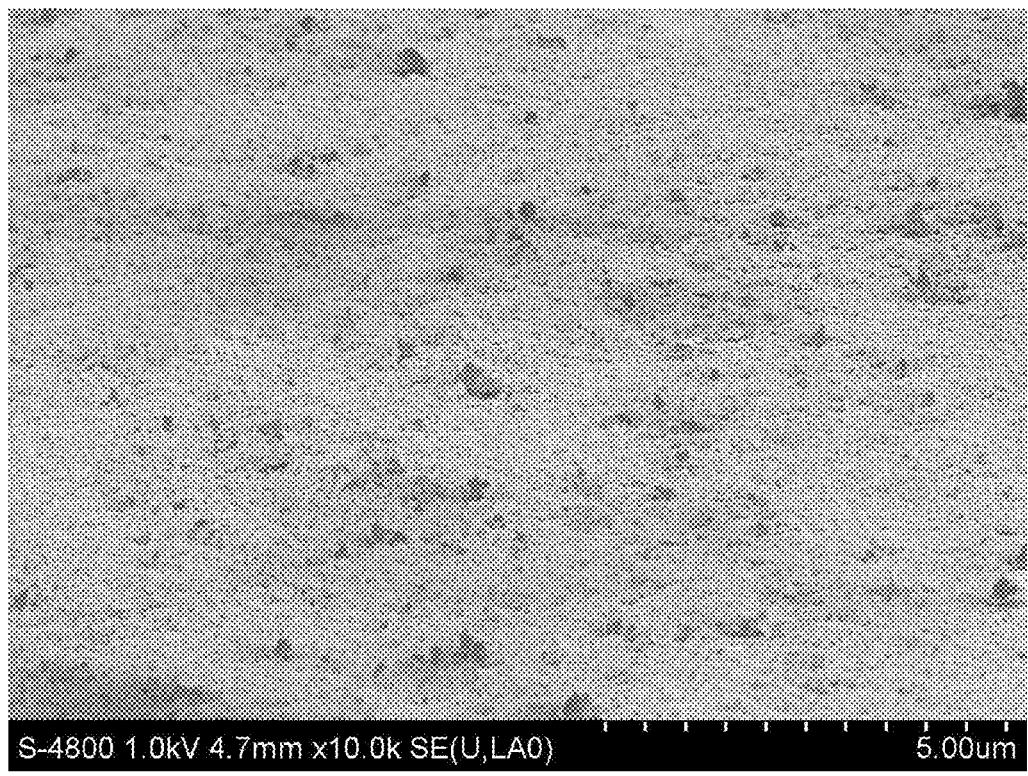

While a range of flows and temperatures can be made in parts of the WRIN and also the chamber size and squeeze factor varied, there are optimal conditions for the exiting materials. Softer materials will require lower velocities to cause surface deformation, while harder materials will require high velocities. Also, the mass of the material being deposited will change the required velocity, with smaller sized powders requiring higher velocities due to quick slowing from its low momentum energy, in which mass is a factor. The stronger structures at about 150 to about 300 nm need a velocity of about 40 m/s to about 90 m/s when soda-lime glass is at about 600° C. When the velocity is too high, the powder may embed too deeply and not leave the desirable high structure for wear protection. A more preferred range is about 50 to about 70 m/s WRIN exit velocity for borosilicate nanoparticles onto about 600° C. soda-lime glass. It is desirable to have the WRIN material exit at or above the substrate temperature, but below the melting point of the powder material. It is not desirable to splatter melted powders against the surface, as in thermal spray processes, which result in pancake-like structures. It is preferable to have the material ionically or covalently bound to the substrate surface, so the temperature needs to be high enough to enable strong bonding after the powders partially deform the surface.

Another factor of the WRIN device is the ratio of its maximum width to that of its exit, termed the "squeeze diaphragm ratio." Preferably, this ratio is from about 250:1 down to about 20:1, and more preferably in the range of about 150:1 to about 50:1.

To properly protect the surface, there are appropriate sizes and densities of the strong structures. So there is less effect on optical properties, the functional range of strong structure size in height is about 80 to about 400 nm, and more preferably the range is about 100 to about 300 nm. The width of the strong structures should be greater than about 100 nm and more preferably greater than about 150 nm. Nanostructures should be lower in height than the strong structures. The strong structures should have spacing that do not allow solids to encounter the nanostructures, and this can be achieved with strong structure spacing of less than about 5 μm, preferably less than about 2 μm, and more preferably less than about 1 μm average spacing.

The process of the present invention can be used with a range of substrate materials in addition to ceramics and glasses. Polymer surfaces can have their surface properties modified with an enhanced durability. To accomplish coating onto temperature-sensitive substrates, the temperature of the device is reduced. Gas flows are similar to those at higher temperature operation, which means the gas velocity is slightly reduced. The polymers can be homogenous or have a top coating, such as a hard coat or paint.

Bare polymers, such as polycarbonate, typically have water contact angles of about 80°. With coatings of the present invention, the surface becomes more hydrophilic, with a contact angle of less than 20°, and with a treatment using surface energy lowering chemical agents, the contact angle can exceed 120°, and even be up to 170°. One of skill in the art is aware of the multitude of surface modifying chemistries that are commercially available and will be able to readily use those introduced in the future.

There are many uses for polymers with altered surface properties. If the original material is clear, usually a clear coating is desired. If the surface is colored, then it is normally desirable not to alter the color. In some cases, low reflection is desired, in particular, for clear materials so that vision through the material is not disturbed by reflected images. For many painted surfaces, a gloss is desired, but occasionally less sheen is desired. Possible polymer-based products include vision ware, windows, windshields, vehicle bodies, outdoor furniture, buildings and structures, energy devices, such as wind turbines, boats, piping, kitchen surfaces, and wet preparation areas.

The WRIN device can be used as the primary substrate temperature control. The gasses can heat the substrate to a desirable level at the same time as depositing the material. This is especially true with lower temperature materials, such as polymers. In this operational mode, no substrate heater is needed.

The present invention can also be used to modify the surface of materials to reduce friction by changing the tribology of the surface. The nanostructure provided by the present invention is amenable to a wide range of chemical treatments, including low friction materials. One example is the creation of an oleophillic surface to produce enhanced oil wetting and thus reduce wear over time.

BRIEF DESCRIPTION OF FIGURES

FIG. 1.

Schematic of WRIN. At the top of the device the precursor or nanopowder is inputted into the WRIN. If a precursor is provided, an igniter is present to ensure the combustion or conversion of the precursor to ultrafine or nanopowder. Along the device are heaters to control the temperature profile of the nanopowders and gasses, to achieve the desired level of enthalpy. To control the velocity to higher levels a boost gas is inputted in addition to the gasses related to inputting the nanopowder or its precursor. In the Middle and Base Heater sections, nanopowders can collide and grow to near the desired size. By increasing or decreasing the length of the Middle section powder size and powder size distribution can be changed. Additionally, there is a Control gas input that aids in Venturi acceleration and can also provide a controlled gas environment if reduced air is desired in the deposition zone. The Control gas flows through the Base Heater section, so it is heated and then is emitted on either side of the powder-containing gas flow to minimize entrainment of cool ambient gasses that would cool the primary nanopowder and ultrafine powder containing flow being emitted from the Nozzle Outlet Slit. The base heater section narrows, preferably at least about 20:1, towards the Outlet Slit to provide acceleration and directionality to the gas stream.

FIG. 2.

Schematic of idealized surface structures for durable coatings showing about 100 to about 800 nm separation between strong features and most of the fine features being lower than the height of the strong features, so that they are protected by the strong features.

FIG. 3.

SEM (FIG. 3A), cross sectional STEM images (FIG. 3B), and EDX spectra (FIG. 3C, D, E) of a durable superhydrophobic coating made using an embodiment of the present invention, the WRIN device of FIG. 1. This coating is of borosilicate nanopowder onto standard soda-lime glass. From the SEM plan view image (FIG. 3A), it can be seen that dual-sized semi-spherical and other irregular features were deposited onto the glass surface, with the glass surface deformed by the deposited features. In the cross sectional STEM image (FIG. 3A), the original glass is lighter gray than the coating material and is in the lower section of the image. It can be seen that the particle indented (deformed) the surface of the glass substrate. In the STEM image (FIG. 3B) and the corresponding EDX spectrum (FIG. 3C, D, E), a distinct intermediate composition layer, providing strong bonding, can be identified.

FIG. 4.

SEM plane view image of a superhydrophobic coating on polymer substrate made using the WRIN device of FIG. 1. There are ~100 to ~300 nm strong structures with <~100 nm finer structures between them.

FIG. 5.

SEM plan view images a durable superhydrophobic coating made using a combination of an embodiment of the present invention, the WRIN device of FIG. 1 and CCVD. It can be seen that the coating shows a dual-sized NVC structure with fine features, as a result of the CCVD, covered on larger features, as a result of the WRIN.

EXAMPLES

Example 1

Making Functional Surfaces Using WRIN Device with Flame-Produced Nanopowders: Soda-Lime Glass Substrate As an example, to deposit durable coatings on soda-lime glass substrates, the following typical deposition conditions were used with the WRIN device in FIG. 1, with the length of the outlet slit being 20 cm. A solution of TEOS with 10 mol. % triethylborate and 0.5 mol. % aluminum acetalacetonate in alcohol was finely atomized and entered at a rate of 14 mL/min, which was combusted in the upper section to produce nanopowders in a gas medium, and a boost gas flow of air at 60 L/min. The heaters were controlled so that the powder containing WRIN outlet temperature was 650° C.; a heater controlled the glass substrate surface temperature of 600° C.; the WRIN device was moved relatively across the substrate at a motion speed of 50 inches/min; the glass heater was increased for an anneal temperature of 675° C. during an anneal time of 5 min after deposition, after which the glass was cooled so that it would not crack. The coating was then treated with a low surface energy chemical agent to make it superhydrophobic.

Example 2

Making Functional Surfaces Using WRIN Device with Flame-Produced Nanopowders: Soda-Lime Glass Substrate As another example, to deposit durable coatings on soda-lime glass substrates, the following typical deposition conditions were used with the WRIN device in FIG. 1, with the length of the outlet slit being 20 cm. A solution of TEOS with 5 mol. % triethylborate and 0.5 mol. % aluminum acetalacetonate in alcohol was finely atomized and entered at a rate of 14 mL/min, which was combusted in the upper section to produce nanopowders in a gas medium, and a boost gas flow of air at 180 L/min. The heaters were controlled so that the powder containing WRIN outlet temperature is 640° C.; a heater controlled the glass substrate surface temperature of 650° C.; the WRIN device was moved relatively across the substrate, at a motion speed of 7 inches/min; The coating was then treated with a low surface energy chemical agent to make it superhydrophobic.

Example 3

Making Functional Surfaces Using WRIN Device with Flame-Produced Nanopowders: Polycarbonate Substrate As another example, to deposit durable coatings on polymer substrates, in this case polycarbonate, the same conditions and device were used as the previous example, except that the solution flow rate was 6 mL/min, the boost gas flow was 75 L/min, the heaters were adjusted to create a WRIN outlet temperature of 210° C., a substrate heater was used to provide a surface temperature of 94° C., and the motion speed was 20 inches/min. The coating was then treated with a low surface energy chemical agent to make it superhydrophobic.

Example 4

Making Functional Surfaces Using WRIN Device with Flame-Produced Nanopowders and CCVD: Soda-Lime Glass Substrate As another example, to deposit durable coatings with large features on soda-lime glass substrates, the following typical deposition conditions were used with the WRIN device in FIG. 1, with the length of the outlet slit being 20 cm. A solution of TEOS with 5 mol. % triethylborate and 0.5 mol. % aluminum acetalacetonate in alcohol was finely atomized and entered at a rate of 14 mL/min, which was combusted in the upper section to produce nanopowders in a gas medium, and a boost gas flow of air at 70 L/min. The heaters were controlled so that the powder containing WRIN outlet temperature was 650° C.; a heater controlled the glass substrate surface temperature of ~635° C.; the WRIN device was moved relatively across the substrate at a motion speed of 7 inches/min After the coating with large features was deposited, the CCVD technique was used to deposit a coating with nanofeatures between and on top of the coating with large features to form a dual-sized NVC structure. The following typical conditions of CCVD were used: a solution of TEOS with 5 mol. % triethylborate and 0.5 mol. % aluminum acetalacetonate, a rate of 4 mL/min, a flame temperature of 1000° C. above the glass surface, and a motion speed of 120 in/min. The coated surface was then abraded to remove the nanofeatures from off the top of the strong structures, thus leaving the nanofeatures in the lower areas protected by the strong features. The coated surface was then treated with a low surface energy chemical agent to make it superhydrophobic, and a rolling angle of less than 15° was achieved.

Embodiments of the present invention also include:

A process for making a functional surface on a substrate wherein gas phase-formed nano and ultrafine inorganic powders are immediately directed at a surface with sufficient velocity and at a sufficient temperature to cause deformation of the surface and adhesion of the powders to the substrate surface.

A process for making a functional surface on a substrate wherein gas phase-formed nano and ultrafine inorganic powders are immediately directed at a surface with sufficient velocity and at a sufficient temperature to cause deformation of the surface and adhesion of the powders to the substrate surface, wherein the powders are made using a combustion process.

A process for making a functional surface on a substrate wherein gas phase-formed nano and ultrafine inorganic powders are immediately directed onto a surface with sufficient velocity and at a sufficient temperature to cause embedding of the powders to the substrate surface by partially deforming the substrate or polymers or both and partially melting the interface between the powders and the substrate.

A process for making a functional surface on a substrate wherein gas phase-formed nano and ultrafine inorganic powders are immediately directed onto a surface with sufficient velocity and at a sufficient temperature to cause adhesion of the powders to the substrate surface, wherein the powders are made using a combustion process.

A process for making a functional surface on a substrate wherein gas phase-formed nano and ultrafine inorganic powders are immediately directed at a surface with sufficient velocity and at a sufficient temperature to cause adhesion of the powders to the substrate surface, wherein the velocity and temperature control is provided by a device with a linear, narrow gap formed by heated walls narrowing down, and sufficient gas flows and pressures are provided to develop the desired velocity.

A process for making a functional surface on a substrate wherein gas phase-formed nano and ultrafine inorganic powders are immediately directed onto a surface with sufficient velocity and at a sufficient temperature to cause adhesion of the powders to the substrate surface, wherein the powder is at least partially embedded into the original surface of the substrate by deforming the substrate or the powders or both.

A process for making a functional surface on a substrate wherein gas phase-formed nano and ultrafine inorganic powders are immediately directed at a surface with sufficient velocity and at a sufficient temperature to cause adhesion of the powders to the substrate surface, wherein the powder material is harder than the substrate surface.

A process for making a functional surface on a substrate wherein gas phase-formed nano and ultrafine inorganic powders are immediately directed at a surface with sufficient velocity and at a sufficient temperature to cause adhesion of the powders to the substrate surface, wherein the powder material is harder than the substrate surface, wherein the substrate material is a polymer.

A process for making a functional surface on a substrate wherein gas phase-formed nano and ultrafine inorganic powders are immediately directed at a surface with sufficient velocity and at a sufficient temperature to cause adhesion of the powders to the substrate surface, wherein the surface structures are less than 300 nm in size and are uniform in nature at the micron scale.

A process for making a functional surface on a substrate wherein gas phase-formed nano and ultrafine inorganic powders are immediately directed at a surface with sufficient velocity and at a sufficient temperature to cause adhesion of the powders to the substrate surface, wherein there is a mixed composition layer of material between the original substrate material and the bonded powder material.

A process for making a functional surface on a substrate wherein gas phase-formed nano and ultrafine inorganic powders are immediately directed at a surface with sufficient velocity and at a sufficient temperature to cause adhesion of the powders to the substrate surface, wherein the powder material indents the original substrate surface.

A process for making a functional surface on a substrate wherein gas phase-formed nano and ultrafine inorganic powders are immediately directed at a surface with sufficient velocity and at a sufficient temperature to cause adhesion of the powders to the substrate surface, wherein the velocity and temperature control is provided by a device with a linear, narrow gap formed by heated walls narrowing down, and sufficient gas flows and pressures are provided to develop the desired velocity, wherein there is about 10,000,000 to about 10,000,000,000 powder particles ejected per minute per mm length of the outlet gap with a traverse speed across the surface being coated of about 0.01 to about 10 m/minute. These numbers are provided as an example of how to predict the density of structures made, and the actual traverse speed can be varied greatly, depending on the production line speed or properties desired.

A process for making a functional surface on a substrate wherein gas phase-formed nano and ultrafine inorganic powders are immediately directed at a surface with sufficient velocity and at a sufficient temperature to cause adhesion of the powders to the substrate surface, wherein there are larger stronger features in the range of about 100 nm to about 400 nm and also smaller features of less than 100 nm in between and lower in height than the larger features.

A process for making a functional surface on a substrate wherein gas phase-formed nano and ultrafine inorganic powders are immediately directed at a surface with sufficient velocity and at a sufficient temperature to cause adhesion of the powders to the substrate surface, wherein there are larger stronger features in the range of about 100 nm to about 400 nm and also smaller features of less than 100 nm in between and lower in height than the larger features, wherein there are about 500,000 to about 5,000,000 strong particles per $mm^2$.

A process for making a functional surface on a substrate wherein gas phase-formed nano and ultrafine inorganic powders are immediately directed at a surface with sufficient velocity and at a sufficient temperature to cause adhesion of the powders to the substrate surface, wherein the velocity and temperature control is provided by a device with a linear, narrow gap formed by heated walls narrowing down, and sufficient gas flows and pressures are provided to develop the desired velocity, wherein the narrowing down ratio is from about 150:1 down to about 20:1, and more preferably in the about 100:1 to about 50:1 range.

A process for making a functional surface on a substrate wherein gas phase-formed nano and ultrafine inorganic powders are immediately directed at a surface with sufficient velocity and at a sufficient temperature to cause adhesion of the powders to the substrate surface, wherein the final properties are hydrophilic or hydrophobic or other desirable properties.

All documents, books, manuals, papers, patents, published patent applications, guides, abstracts, and other references cited herein are incorporated by reference in their entirety. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

The invention claimed is:

1. A process for making a functional surface on a glass substrate wherein gas phase-formed nano and ultrafine inorganic powders are created in a gas flow and, while still in the gas flow, are immediately directed at a substrate surface with sufficient velocity and at a sufficient temperature to cause deformation of the substrate surface, adhesion of the powders to the substrate surface, and at least partially embed the particles into the surface of the substrate, to form surface structures less than 300 nm in size.

2. The process of claim 1 wherein the powders are made using a combustion process.

3. The process of claim 1 wherein the velocity and temperature control are provided by a device with a linear, narrow gap formed by heated walls narrowing down, and sufficient gas flows and pressures are provided to develop a sufficient velocity.

4. The process of claim 3 wherein there is about 100,000,000 to about 100,000,000,000 powder particles ejected per minute per mm length of the outlet gap with a traverse speed across the surface being coated of about 1 to about 100 m/minute.

5. The process of claim 3 wherein the device exit velocity is controlled to be in the range of 20 to 80 m/s and the exit temperature is above the substrate temperature but below the melting point of the powder.

6. The process of claim 2 or 3 wherein the combustion process gasses are cooled below the temperature of the heated walls, so that the temperature of the exiting gasses and material is controlled by the heated walls.

7. The process of claim 6 wherein gasses are added in after the combustion to moderate the temperature of the gasses, to within 100° C. of the temperature of the heated walls.

8. The process of claim 1 wherein at least part of the gas phase-formed nano and ultrafine inorganic powders deposited is from vapor material.

9. The process of claim 1 wherein radiation heaters are located above either the incoming substrate surface or coated exiting substrate surface, or both.

* * * * *